(12) United States Patent  
Green et al.

(10) Patent No.: US 8,402,529 B1
(45) Date of Patent: Mar. 19, 2013

(54) PREVENTING PROPAGATION OF MALICIOUS SOFTWARE DURING EXECUTION IN A VIRTUAL MACHINE

(75) Inventors: David E. Green, Pleasant Grove, UT (US); Richard Payne, Santaquin, UT (US); Trevor Wood, Orem, UT (US)

(73) Assignee: M86 Security, inc., Irvine, CA (US)

( * ) Notice: Subject to any disclaimer, the term of this patent is extended or adjusted under 35 U.S.C. 154(b) by 1071 days.

(21) Appl. No.: 12/130,609

(22) Filed: May 30, 2008

Related U.S. Application Data

(60) Provisional application No. 60/940,946, filed on May 30, 2007, provisional application No. 60/940,942, filed on May 30, 2007, provisional application No. 60/940,944, filed on May 30, 2007.

(51) Int. Cl.
*H04L 29/06* (2006.01)
(52) U.S. Cl. .......................................................... 726/11
(58) Field of Classification Search ...................... 726/11
See application file for complete search history.

(56) References Cited

U.S. PATENT DOCUMENTS

| | | | |
|---|---|---|---|
| 3,858,182 A | 12/1974 | Delagi et al. | |
| 5,278,901 A | 1/1994 | Shieh et al. | |
| 5,440,723 A | 8/1995 | Arnold et al. | |
| 5,542,044 A | 7/1996 | Pope | |
| 5,623,600 A | 4/1997 | Ji et al. | |
| 5,696,822 A | 12/1997 | Nachenberg | |
| 5,826,013 A | 10/1998 | Nachenberg | |
| 5,832,208 A | 11/1998 | Chen et al. | |
| 5,842,002 A | 11/1998 | Schnurer et al. | |
| 5,889,943 A | 3/1999 | Ji et al. | |
| 5,901,228 A | 5/1999 | Crawford | |
| 5,974,549 A | 10/1999 | Golan | |
| 5,983,348 A | 11/1999 | Ji | |
| 5,987,610 A | 11/1999 | Franczek et al. | |
| 6,006,328 A | 12/1999 | Drake | |
| 6,065,118 A | 5/2000 | Bull et al. | |
| 6,067,410 A | 5/2000 | Nachenberg | |
| 6,088,801 A | 7/2000 | Grecsek | |
| 6,092,194 A | 7/2000 | Touboul | |

(Continued)

FOREIGN PATENT DOCUMENTS

| | | |
|---|---|---|
| EP | 0578041 | 6/1993 |
| WO | WO9721313 | 6/1997 |

(Continued)

OTHER PUBLICATIONS

United States Patent and Trademark Office, "Notice of Allowance", issued in connection with U.S. Appl. No. 12/130,634, Dated Jul. 23, 2012, (7 pages).

(Continued)

*Primary Examiner* — Jason Gee
(74) *Attorney, Agent, or Firm* — Hanley, Flight & Zimmerman, LLC

(57) ABSTRACT

A system and method for preventing propagation of malicious content associated with an electronic message are disclosed. An electronic message and content associated with the electronic message is simulated in a virtual machine which emulates the destination computing device of the electronic message. A virtual firewall receives one or more commands as the electronic message or content associated with an electronic message is executed. Initially, the virtual firewall establishes a network connection and determines the type of action associated with the commands. If the type of action comprises a connection maintenance or configuration command, the network connection is maintained. If the type of action comprises a data transmission command, the network connection is terminated. This allows the virtual machine to simulate performance of a networked computer by transmitting a subset of the data through a network connection.

15 Claims, 9 Drawing Sheets

U.S. PATENT DOCUMENTS

| | | | |
|---|---|---|---|
| 6,094,731 | A | 7/2000 | Waldin et al. |
| 6,108,799 | A | 8/2000 | Boulay et al. |
| 6,154,844 | A | 11/2000 | Touboul et al. |
| 6,269,447 | B1 | 7/2001 | Maloney et al. |
| 6,272,641 | B1 | 8/2001 | Ji |
| 6,275,938 | B1 | 8/2001 | Bond et al. |
| 6,330,590 | B1 | 12/2001 | Cotten |
| 6,643,686 | B1 | 11/2003 | Hall |
| 6,691,230 | B1 | 2/2004 | Bardon |
| 6,694,435 | B2 | 2/2004 | Kiddy |
| 6,701,438 | B1 | 3/2004 | Prabandham et al. |
| 6,732,179 | B1 | 5/2004 | Brown et al. |
| 6,775,780 | B1 | 8/2004 | Muttik |
| 6,973,577 | B1 | 12/2005 | Kouznetsov |
| 6,981,279 | B1 | 12/2005 | Arnold et al. |
| 6,981,280 | B2 | 12/2005 | Grupe |
| 6,990,513 | B2 | 1/2006 | Belfiore et al. |
| 7,017,187 | B1 | 3/2006 | Marshall et al. |
| 7,058,822 | B2 | 6/2006 | Edery et al. |
| 7,237,264 | B1 | 6/2007 | Graham et al. |
| 7,607,171 | B1 | 10/2009 | Marsden et al. |
| 2002/0007453 | A1 | 1/2002 | Nemovicher |
| 2002/0013910 | A1 | 1/2002 | Edery et al. |
| 2002/0069369 | A1* | 6/2002 | Tremain ............ 713/201 |
| 2002/0116635 | A1 | 8/2002 | Sheymov |
| 2002/0129281 | A1 | 9/2002 | Hatfalvi et al. |
| 2002/0162015 | A1 | 10/2002 | Tang |
| 2002/0162025 | A1 | 10/2002 | Sutton et al. |
| 2003/0009689 | A1* | 1/2003 | Kolb ............ 713/201 |
| 2003/0065943 | A1 | 4/2003 | Geis et al. |
| 2003/0097409 | A1 | 5/2003 | Tsai |
| 2003/0159070 | A1 | 8/2003 | Mayer et al. |
| 2004/0006706 | A1 | 1/2004 | Erlingsson |
| 2004/0034794 | A1 | 2/2004 | Mayer et al. |
| 2004/0148514 | A1 | 7/2004 | Fee et al. |
| 2004/0215971 | A1 | 10/2004 | Nam |
| 2004/0255161 | A1* | 12/2004 | Cavanaugh ............ 713/201 |
| 2004/0268147 | A1* | 12/2004 | Wiederin et al. ............ 713/201 |
| 2005/0273856 | A1 | 12/2005 | Huddleston |
| 2006/0015939 | A1 | 1/2006 | Aston et al. |
| 2006/0174343 | A1 | 8/2006 | Duthie et al. |
| 2006/0195894 | A1 | 8/2006 | Nita et al. |
| 2006/0253906 | A1* | 11/2006 | Rubin et al. ............ 726/23 |
| 2007/0294744 | A1* | 12/2007 | Alessio et al. ............ 726/1 |
| 2008/0098476 | A1 | 4/2008 | Syversen |
| 2008/0134337 | A1 | 6/2008 | Crescenzo et al. |
| 2008/0172738 | A1 | 7/2008 | Bates et al. |
| 2008/0289040 | A1 | 11/2008 | Ithal |
| 2009/0222922 | A1 | 9/2009 | Sidiroglou et al. |
| 2010/0146615 | A1 | 6/2010 | Locasto et al. |

FOREIGN PATENT DOCUMENTS

| | | |
|---|---|---|
| WO | WO9819482 | 5/1998 |
| WO | WO9832304 | 7/1998 |

OTHER PUBLICATIONS

United States Patent and Trademark Office, "Office action", issued in connection with U.S. Appl. No. 12/130,659, Dated Oct. 21, 2011 (17 pages).

United States Patent and Trademark Office, "Office action", issued in connection with U.S. Appl. No. 10/299,452, Dated Aug. 18, 2008, (11 pages).

United States Patent and Trademark Office, "Office action", issued in connection with U.S. Appl. No. 10/299,452, Dated Dec. 7, 2007, (10 pages).

United States Patent and Trademark Office, "Office action", issued in connection with U.S. Appl. No. 10/299,452, Dated Jul. 23, 2007, (13 pages).

United States Patent and Trademark Office, "Office action", issued in connection with U.S. Appl. No. 11/045,681, Dated Oct. 30, 2007, (25 pages).

United States Patent and Trademark Office, "Office action", issued in connection with U.S. Appl. No. 12/113,010, Dated Oct. 7, 2011, (14 pages).

United States Patent and Trademark Office, "Office action", issued in connection with U.S. Appl. No. 12/113,010, Dated Apr. 28, 2011, (19 pages).

United States Patent and Trademark Office, "Office action", issued in connection with U.S. Appl. No. 10/933,967, Dated Dec. 7, 2007, (15 pages).

United States Patent and Trademark Office, "Office action", issued in connection with U.S. Appl. No. 10/933,967 Dated Jul. 12, 2007, (19 pages).

United States Patent and Trademark Office, "Office action", issued in connection with U.S. Appl. No. 10/933,967, Dated Feb. 7, 2007, (24 pages).

United States Patent and Trademark Office, "Office action", issued in connection with U.S. Appl. No. 11/012,742, Dated Oct. 31, 2007, (24 pages).

United States Patent and Trademark Office, "Office action", issued in connection with U.S. Appl. No. 12/113,010, Dated Mar. 23, 2012, (16 pages).

United States Patent and Trademark Office, "Office action", issued in connection with U.S. Appl. No. 12/130,659, Dated Mar. 14, 2012, (20 pages).

United States Patent and Trademark Office, "Office action", issued in connection with U.S. Appl. No. 12/130,659, Dated Oct. 21, 2012, (17 pages).

United States Patent and Trademark Office, "Office action", issued in connection with U.S. Appl. No. 12/130,659, Dated Apr. 14, 2011, (16 pages).

T. Garfinkel and M. Rosenblum. A virtual machine introspection based architecture for intrusion detection. In Proc. Net. and Distributed Sys. Sec. Symp., Feb. 2003 (16 pages).

United States Patent and Trademark Office, "Office action", issued in connection with U.S. Appl. No. 12/130,634, Dated Nov. 30, 2011, (15 pages).

United States Patent and Trademark Office, "Office action", issued in connection with U.S. Appl. No. 12/130,634, Dated Apr. 12, 2011, (14 pages).

United States Patent and Trademark Office, "Office action", issued in connection with U.S. Appl. No. 10/299,452, Dated Jan. 11, 2007, (11 pages).

United States Patent and Trademark Office, "Office action", issued in connection with U.S. Appl. No. 10/299,452, Dated Jun. 22, 2006, (14 pages).

United States Patent and Trademark Office, "Notice of Allowance", issued in connection with U.S. Appl. No. 10/299,452, Dated Jun. 8, 2009, (14 pages).

United States Patent and Trademark Office, "Notice of Allowance", issued in connection with U.S. Appl. No. 12/130,634, Dated Apr. 2, 2012, (9 pages).

* cited by examiner

PREVENTING PROPAGATION OF MALICIOUS SOFTWARE DURING EXECUTION IN A VIRTUAL MACHINE

CROSS REFERENCE TO RELATED APPLICATIONS

This application claims priority, under 35 U.S.C. §119(e), from U.S. Provisional Application No. 60/940,946, filed May 30, 2007, titled "Preventing Propagation of Malicious Software During Execution in a Virtual Machine," U.S. Provisional Application No. 60/940,942, filed May 30, 2007, titled "System and Method for Malicious Software Detection in Multiple Protocols" and U.S. Provisional Application No. 60/940,944, filed May 30, 2007, titled "Automated Generation of a Database for Identifying Malicious Software," all of which are incorporated by reference herein in their entirety.

BACKGROUND OF THE INVENTION

1. Field of the Invention

This invention generally relates to malicious software detection. More particularly, it relates to a system and method for isolating the execution of malicious software.

2. Description of the Related Art

Security threats have become increasingly able to evade conventional signature or pattern based detection techniques. In addition to viruses, additional types of malicious software ("malware"), such as zero-day attacks, targeted threats, mass variant attacks and blended threats, have become increasingly common techniques for damaging systems and accessing data. These additional types of malware use multiple secondary channels, such as active content or links embedded in a message to infiltrate computing systems.

Blended threats use active content (e.g., Java™, JavaScript™, ActiveX™, etc.) or universal resource locators (URLs) embedded within an e-mail, or other electronic message, to link a user to Web sites where malware is downloaded in the background. Some blended threats use active content embedded within the message to begin downloading malware when the user views the message in a preview pane of the user's messaging client. As conventional anti-virus products are reactive, relying on prior knowledge of the virus and a previously written virus definition or "signature" to detect the virus in the future. Because conventional virus detection techniques examine message attachments for malware, they are unable to detect malicious code embedded within the message. Similarly, Web-filters examine Web sites for content, not for malicious behavior, so the filters are also unable to detect these blended threats. Hence, blended threats that use a combination of channels to attack computing systems. Further, conventional malware detection techniques cannot process the embedded URLs and active content in the same context as end-user execution of the embedded content, so blended threats evade detection by using secondary channels to deliver an attack. However, even if malware is executed in a similar context as the end user, malware must be isolated during execution to prevent from being propagated to additional systems or devices.

SUMMARY OF THE INVENTION

The present invention overcomes the limitations of the conventional art by providing a system and method for detecting viruses and other malicious software, such as blended threats, mass variant attacks, targeted threats and zero-day attacks, using a simulation system which monitors software execution. In one embodiment, a server or system includes multiple virtual machines for executing electronic messages and content associated with the electronic messages. A simulation manager associates received electronic messages and content associated with the electronic messages with virtual machines. The simulation manager transmits the electronic messages and content associated with the electronic messages through a virtual firewall to the associated virtual machine for execution. The virtual firewall also establishes a network connection responsive to commands from execution of the electronic message and content associated with the electronic message by the virtual machine. In one embodiment, the virtual firewall also manages resources, such as network connections, shared between one or more virtual machines. Responsive to the type of command received from the virtual machine, the virtual firewall either maintains the network connection or terminates the network connection. For example, receipt of a configuration or maintenance command by the virtual firewall causes the network connection to be maintained while receipt of certain data transfer commands, such as requests to transmits system data or user information, causes termination of the network connection prior to data transmission. In an embodiment, certain types of data transfer commands are permitted to transfer data using the network connection, allowing the virtual machine to more accurately simulate a destination computing system. The transmitted data is closely monitored by the virtual firewall which terminates the network connection if certain types of data, such as system configuration data are attempted to be transmitted.

In an embodiment, the virtual firewall receives one or more commands from an electronic message or content associated with an electronic message that is executed by the virtual machine. Initially, the virtual firewall establishes a network connection, allowing the virtual machine to appear to include an external network connection. The type of action associated with the command is then determined by the virtual firewall. If the type of action comprises a connection maintenance or configuration command, the network connection is maintained. If the type of action comprises a data transmission command, it is determined whether the transmission command is known to be malicious. If the command is known to be malicious, the network connection is terminated prior to executing the command. However, if the data transmission command is not known to be malicious, the command is executed and the data transmission is monitored. If the monitored data transmission requests or attempts to transmit certain types of data, the network connection is terminated before the data is transmitted. This allows the virtual machine to simulate performance of a networked computer by transmitting a subset of the data through a network connection. However, the virtual firewall prevents transmission of certain data, such as user information or file system data, by terminating the network connection upon receipt of certain types of data transmission commands. Hence, the virtual machine appears to be a networked computing device to the software being executed in the virtual machine.

The features and advantages described in the specification are not all inclusive and, in particular, many additional features and advantages will be apparent to one of ordinary skill in the art in view of the drawings, specification and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
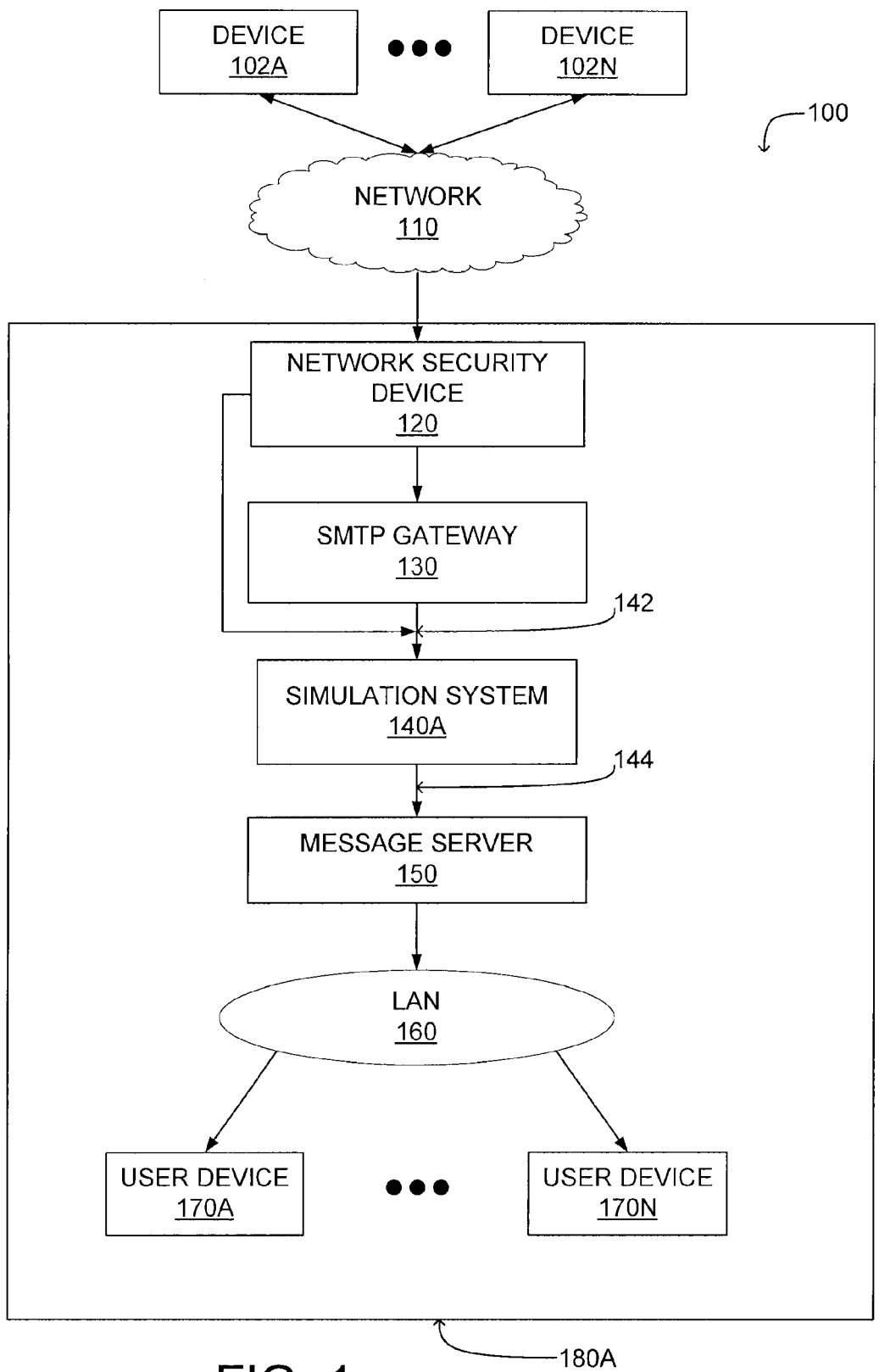
FIG. 1 is a block diagram of a system for detecting malicious content associated with an electronic message according to an embodiment of the present invention.

A system and method for detecting malicious content associated with an electronic message, such as an email or instant message. For purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

System Architecture

FIG. 1 shows a block diagram of a system 100 for detecting malicious content associated with an electronic message according to an embodiment of the present invention. The system 100 includes one or more devices 102A-N which exchange electronic messages, such as electronic mail (e-mail), text messages, short message service (SMS) messages, Multimedia Messaging Service (MMS) messages, Instant Message™ data, commands, hypertext transport protocol (HTTP) requests, HTTP responses, transmission control protocol/Internet protocol (TCP/IP) packets, User Datagram Protocol (UDP) packets, simple mail transfer protocol (SMTP) messages, file transfer protocol (FTP) requests or other electronic information from a first device 102A to a second device 102B, between or among themselves using the network 110. Additionally, the network 110 allows one or more devices 102A-N to communicate with user devices 170A-N included in an enterprise system 180. In an embodiment, the enterprise system 180 includes a network security device 120, simple mail transfer protocol (SMTP) gateway 130, a simulation system 140A, a message server 150, a local area network (LAN) 160 and one or more user devices 170A-N. The simulation system 140 receives the electronic messages and determines whether malicious content is associated with the received electronic messages.

In an embodiment, the simulation system 400 uses one or more virtual machines to examine the electronic messages for malicious content in a contained and isolated execution environment.

The devices 102A-N and/or user devices 250A-N may be any electronic device capable of transmitting and receiving data, such as desktop computers, laptop computers, e-mail servers, Web servers mobile communication devices and smart phones. Electronic messages from certain senders may include malicious content, such as malware, which harms a destination device 102 or a destination user device 250. For example, an e-mail includes one or more attachments in addition to plain text messages. The attachments may be of a plurality of attachment types, including executable types, such as dynamic link library files or executable files, or script files, such as JavaScript™ or Visual Basic™ script. When a recipient at a user device 250 or device 102 selects an executable attachment, the attachment is executed by the device 102 or the user device 250. Alternatively, executable code is embedded within the e-mail so that opening the e-mail automatically executes the embedded code. For example, an e-mail is formatted as hypertext markup language (HTML) which includes script language that is executed when the e-mail is opened by a recipient. In another embodiment, the electronic message includes content associated with uniform resource locators or internet protocol (IP) addresses or other networked content or communication commands. For example, an e-mail or text message includes a hyperlink to a harmful web site that is initially formatted as plain text; however, the plain text can be reformatted by a device 102 or user device 250 into a functional hyperlink when the e-mail or text message is viewed using the device 102 or user device 250.

The network 110 couples devices and/or systems, such as the devices 102A-N and/or enterprise system 180, for communication. The network 100 communicates electronic messages, such as e-mail, short message service (SMS) messages or other text messages, chat messages, torrent files or other types of electronic communications, are transmitted between devices 102A-N and/or user device 170A-N. In one embodiment, the network 110 comprises a wired communication system such as Ethernet, integrated services digital network (ISDN), digital subscriber line (DSL), asynchronous transfer mode (ATM), or other wired communication systems. Alternatively, the network 100 comprises a wireless communication system, such as Wideband Code Division Multiple Access (W-CDMA), CDMA200, Global System for Mobile Communications (GSM), General Packet Radio Service (GPRS), Wireless Local Area Network (W-LAN), Worldwide Interoperability for Microwave Access (WiMAX) or wireless communication systems allowing. In an embodiment, the network 110 comprises a combination of a wireless communication system and a wired communication system.

Additionally, the network 110 allows communication using various types of networking protocols, such as multi-protocol label switching (MPLS), transmission control protocol/Internet protocol (TCP/IP), User Datagram Protocol (UDP), session initiation protocol (SIP), the session description protocol (SDP), hypertext transport protocol (HTTP), simple mail transfer protocol (SMTP), file transfer protocol (FTP), or any other suitable protocol. Data exchanged over the network 110 may be represented using various technologies and/or formats such as HTML, extensible markup language (XML), or any other suitable format. In addition, data communicated using the network 110 may be encrypted using conventional encryption technologies, such as the secure sockets layer (SSL), Secure HTTP and/or virtual private networks (VPNs) or Internet Protocol security (IPsec).

The first embodiment of the enterprise system 180A includes the network security device 120, the SMTP gateway 130, the message server 150, the LAN 160 and one or more user devices 170A-N. The network security device 120 blocks transmission or receipt of certain types of data or messages. In various embodiments, the network security device 120 comprises a firewall, a web filter or other device which receives electronic messages such as HTTP requests or TCP/IP and regulates the electronic messages which access the first embodiment of the enterprise system 180A. The SMTP gateway 130 transmits and/or receives electronic messages to and from Internet-based e-mail addresses. Although shown in FIG. 1 as an SMTP gateway 130, in other embodiments, the enterprise system 180 includes a Short Message Service (SMS) server, a chat server, or any other device for exchanging electronic messages between the network 110 and user devices 250A-N included in the enterprise system 180.

The first embodiment of the simulation system 140A receives electronic messages from the SMTP gateway 130 via signal line 142 and transmits at least a subset of the electronic messages to the message server 150 via signal line 144. In an embodiment, the simulation system 140A receives electronic messages from the network security device 120 via signal line 142, allowing the simulation device to receive multiple types of electronic messages, such as HTTP requests, FTP requests, TCP/IP packets, in addition to e-mails, text messages or other messages processed by the SMTP gateway. The simulation system 140A determines whether content associated with a received electronic message is malicious. For example, the simulation system 140A determines whether files attached to an e-mail are malicious or whether code embedded in an e-mail or chat message is malicious. This allows the simulation system 140A to identify content associated with an electronic message that is likely to adversely affect a device 102 or user device 170 if locally executed on the device 102 or user device 170. In an embodiment, the simulation system 140A uses pattern- or signature-matching methods to determine whether an electronic message includes known, or conventional, viruses.

In an embodiment, the simulation system 140A parses a received electronic message into components using pattern- or signature-matching methods. In an embodiment, the simulation system examines received electronic messages for data having a format associated with a network access command, such as plain text having the format "www.website.com" or "http://www.website.com." For example, the simulation system 140A parses an electronic message into three components: URLs, including plain text associated with a hyperlink or Internet Protocol (IP) address, active content (e.g., JavaScript™, Visual Basic™ script, ActiveX™ controls. or other executable content embedded in the electronic message) and attachments. Segmenting electronic messages into different components allows identification of different types of potentially malicious content associated with an electronic message, such as uniform resource locators (URLs) associated with malicious web sites or data, such as plain text, that is also associated with one or more malicious web sites. Hence, the simulation system 140A parses a received electronic message into components, allowing the different components to be separately examined for malicious content, such as malware. Additionally, the simulation system 140A compares electronic messages to patterns or signatures associated with known malicious content, such as previously identified viruses, allowing the simulation system 140A to identify electronic messages associated with content that is known to be malicious. The simulation system 140A then locally simulates execution of the various components to determine whether execution of the various components causes one or more harmful actions.

In the embodiment shown in FIG. 1, the simulation system 140A allows the enterprise system 180A to locally evaluate content associated with electronic messages received by the enterprise system 180A. The simulation system 140A is further described below in conjunction with FIG. 3.

The message server 150 is configured to communicate with the simulation system 140A and transmits and receives electronic messages between the simulation system 140A and user devices 170A-N. In various embodiments, the message server 150 comprises a dedicated computing device or a firmware or software process operating on a computing device. In one embodiment, electronic messages are transmitted between the message server 150 and the user devices 170A-N via the LAN 160, which uses wireless, wired or a combination of wireless and wired communication techniques, as described above with respect to the network 110, to communicate data between the simulation system 140A and user devices 250A-N.

Figure 2:
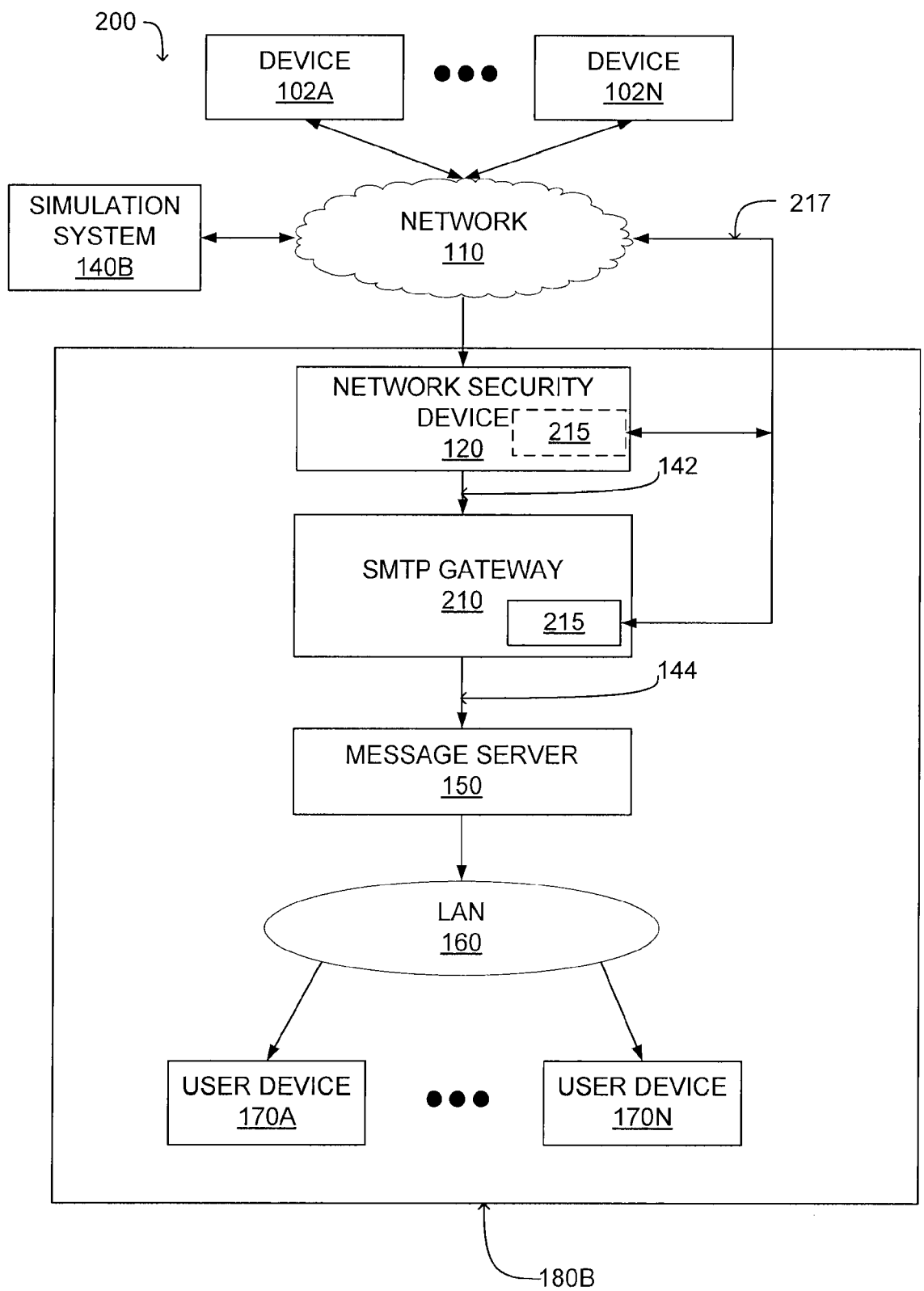
FIG. 2 is a block diagram of a distributed computing system for detecting malicious content associated with an electronic message according to an embodiment of the invention.

FIG. 2 shows a block diagram of a distributed computing system 200 for detecting malicious content associated with an electronic message according to a second embodiment of the invention. The distributed computing system 200 includes one or more devices 102A-N coupled to a network 110. The network 110 communicates electronic messages between various devices 102A-N, an enterprise system 180B and a simulation system 140B.

The devices 102A-N, user devices 170A-N and network 110 used by the distributed computing system 200 have been described above in conjunction with FIG. 1. The enterprise system 180B used by the distributed computing system 200 includes a network security device 120, a message server 150, a LAN 160 and one or more user devices 170A-N, which also have all been described above in conjunction with FIG. 1.

However the enterprise system 180B includes a modified SMTP gateway 210 including an agent 215 which examines received electronic messages for malicious content. Alternatively, the enterprise system 180B includes a modified network security device 120 including an agent which examines received electronic message for malicious content. The modified SMTP gateway 210 receives electronic messages from the network security device 120, and the agent 215 uses pattern- or signature-matching methods to filter received electronic messages and/or parse the electronic message into one or more components. In another embodiment, the network security device 120 uses the agent 215 to filter and/or parse electronic messages received from the network 110 for malicious content as described above. This allows the agent 215 to determine whether an electronic message includes known or conventional viruses. In an embodiment, the agent 215 also uses pattern- or signature-matching methods to parse a received electronic message into components, allowing the components to be examined for malicious content, such as malware. For example, the agent 215 parses an electronic message into three components: URLs, active content (e.g., JavaScript™, Visual Basic™ script, ActiveX™ controls or other executable content embedded in the electronic message) and attachments. Electronic messages associated with content that is not already known to be malicious are transmitted by the agent 215 to the simulation system 140B for evaluation of the content associated with the electronic message. In one embodiment, electronic messages that are not associated with content, such as an e-mail including only plain text, are delivered to the destination user device 170A-N by the SMTP gateway 210. In one embodiment, the agent 215 determines whether received electronic messages are associated with a conventional or known virus or malicious content and quarantines or discards electronic message associated with a conventional or known virus or other malicious content. If the agent 215 is unable to determine that an electronic message is associated with content previously known to be malicious, the agent communicates the electronic message to the simulation system 140B using signal line 146. This allows the agent 215 to quickly identify messages associated with content that is known to be malicious, conserving simulation system 140B resources for electronic messages associated with content that has not been previously determined to be malicious. The agent 215 is further described below in conjunction with FIG. 4.

The simulation system 140B is physically remote from the agent 215. In one embodiment, the simulation system 140B and the agent 215 communicate using a wide area network (WAN) or using an Internet connection, such as signal line 146. In an embodiment, the simulation system 140B includes one or more virtual machines. Electronic messages received from the agent 215 are executed in a virtual machine included on the simulation system 140B and the execution is monitored for malicious actions. Based on the execution monitoring, the simulation system 140B classifies an electronic message as malicious or non-malicious and notifies the agent 210. In one embodiment, the simulation system 140B also generates and stores a database for classifying electronic messages. This generated database is used to determine whether subsequently received messages are malicious, simplifying electronic message classification by using stored classification data rather than execution of electronic messages.

Figure 3:
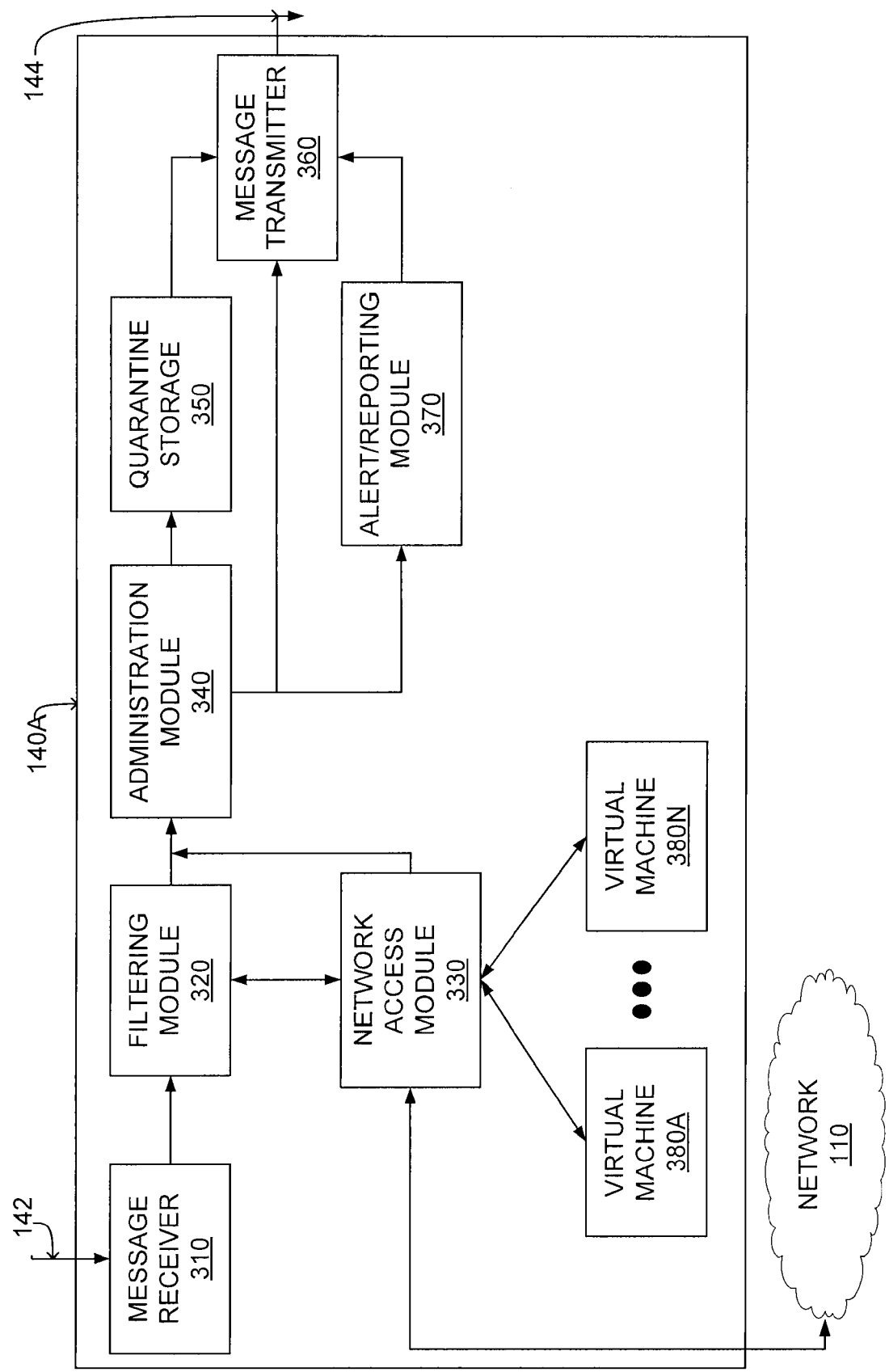
FIG. 3 is a block diagram of a simulation system for detecting malicious content associated with an electronic message according to an embodiment of the invention.

FIG. 3 is a block diagram of a first embodiment of the simulation system 140A for locally detecting malicious content associated with an electronic message according to the invention. The simulation system 140A receives electronic messages and associated content from the SMTP gateway 130 or the network security device 120 via signal line 142 and generates a classification result and/or control signal responsive to classification of content associated with the received electronic message. The classification result and/or control signal is then transmitted to the message server 150 via signal line 144.

The simulation system 140A includes a message receiver 310, a filtering module 320, a network access module 330, an administration module 340, a quarantine storage 350, an alert/reporting module 360, a message transmitter 370 and one or more virtual machines 380A-N. In various embodiments, the message receiver 310, the filtering module 320, the network access module 330, the administration module 340, the quarantine storage 350, the alert/reporting module 360 and/or the message transmitter 370 2, further described below, comprise multiple software processes for execution by a processor (not shown) and/or firmware applications. The software and/or firmware processes and/or applications can be configured to operate on a general purpose microprocessor or controller, a field programmable gate array (FPGA), an application specific integrated circuit (ASIC) or a combination thereof. In another embodiment, the modules comprise portions or sub-routines of a software or firmware application that processes the electronic messages. Moreover, other embodiments can include different and/or additional features and/or components than the ones described here.

The message receiver 310 receives an electronic message and associated content from the SMTP gateway 130 and/or one or more devices 102A-N or user devices 170A-N and transmits the electronic message to the filtering module 320. In an embodiment, the message receives 310 includes a receiver which receives the electronic message and associated content from one or more wireless communication systems described above in conjunction with FIG. 1. Alternatively, the message receives 310 includes a receiver which receives the electronic message and associated content from one or more wired communication systems described above in conjunction with FIG. 1. In another embodiment, the message receiver 310 includes a receiver which receives the electronic message and associated content using a receiver using a combination of wired and wireless communication systems.

The filtering module 320 receives the electronic message and associated content from the message receiver 310. The filtering module 320 examines the electronic message and/or associated content for conventional or known viruses using pattern- or signature-matching methods, allowing rapid identification of electronic messages associated with content that has already been identified as malicious. The filtering module 320 also parses the received message into components which are subsequently examined for the presence of malicious content. In one embodiment 320, the filtering module parses the electronic message and associated content into uniform resource locators (URLs) and other content associated with network access (e.g., hyperlinks formatted as plain text or IP addresses formatted as plain text), active content and attachments to determine whether one or more message components includes malicious content. Alternatively, the filtering module 320 classifies the electronic message and associated content into a category, such as Instant Message (IM) requests, File Transfer Protocol (FTP) requests, Hypertext Transfer Protocol (HTTP) requests, Internet Relay Chat (IRC) communication, Really Simple Syndication (RSS) messages or similar web feeds, torrent files (or other peer-to-peer filing sharing formats) or other active components, allowing greater refinement in the types of malicious software detection. Hence, the filtering module 320 parses any type of received electronic message and associated content into components, allowing malicious content to be detected in various data paths to and from a computer system. Additionally, in one embodiment, the filtering module 320 uses pattern- or signature-matching processes to identify potentially malicious URLs or other content associated with potentially malicious network connection commands. For example, the filtering module 320 compares identified URLs to a listing of URLs previously known to be associated with malicious content.

In one embodiment the filtering module 320 additionally includes a storage device, such as a non-volatile storage device known in the art. The storage device includes a database of content previously determined to be malicious. This facilitates subsequent identification of malicious content by comparing newly received messages to the stored types of content.

The network access module 330 receives the electronic message and associated content from the filtering module 320 and communicates the electronic message and associated content to one or more virtual machines 330. The network access module 330 allows the virtual machines 380 to transmit and receive certain types of data, such as network connection configuration data, using a connection to network 110, while preventing the virtual machines 380 from transmitting user data or system configuration data via network 110. Allowing the virtual machines 380 limited network access through the network access module 330 increases the accuracy with which a virtual machine 380 emulates a destination device 102 or user device 170 by allowing the emulated content associated with the electronic message to operate as if it were on a physical device 102 or user device 170. Additionally, the network interface 330 communicates classification results and/or control signals from a virtual machine 330 to the filtering module 320 or the administration module 340. The network access module 330 is further described below in conjunction with FIGS. 5 and 6.

The administration module 340 determines what action is applied to a message based on the classification result from the network access module 330 or the filtering module 320.

For example, the administration module 340 specifies whether an electronic message associated malicious content is quarantined or flagged. The administration module 340 also transmits messages with no malicious content to the message transmitter 360 for direct transmission to the destination device 102 or user device 170 identified by the electronic message. In one embodiment, the actions taken by the administration module 340 are based on the combination of classification results from the network access module 330 or the filtering module 320 and locally stored configuration data provided by a user. For example, the administration module 340 receives a "quarantine" classification result from the network access module 330 or filtering module 320. Stored user configuration data specifies that electronic messages having a quarantine classification results are to be deleted without notifying the user; hence, the administration module 340 deletes the electronic message without notifying the user, as indicated by the configuration data. Alternatively, the administration module 340 performs actions specified by one or more control signals received from the network access module 330 or the filtering module 320; hence, the virtual machine 380 evaluating the content associated with the electronic message determines how to subsequently process the electronic message and communicates how to process the electronic message via a control signal.

The quarantine storage 350 comprises a data storage device, such as a volatile storage device, a non-volatile storage device or a combination of volatile and non-volatile storage devices, where messages associated with malicious content are stored. The quarantine storage 350 receives electronic messages and associated content from the administration module 340 and stores the received electronic messages and associated content. In one embodiment, the quarantined messages are stored for a specified amount of time and then deleted. Alternatively, the quarantined messages are stored until a user specifies an action (e.g., neutralize malicious content, delete message, archive message, forward message, etc.) to take. In another embodiment, the quarantine storage 350 stores electronic messages and associated content for a specified time interval then communicates the stored electronic messages and associated content to the message transmitter 360 for transmission to a destination device 102 or user device 170 specified by the electronic message.

The message transmitter 360 receives electronic messages and associated content from one or more of the administration module 340, the quarantine storage 350 and/or the alert/reporting module 370. The received electronic messages and associated content are then transmitted to a destination device 102 or destination user device 170 that is specified by the electronic message. Hence, the message transmitter 360 comprises a transmitter that communicates data using a wired system, a wireless system or a combination of wired and wireless systems as described above in conjunction with FIG. 1. Similarly, the message transmitter 360 allows for transmission of data using one or more protocols as described above in conjunction with FIG. 1.

The alert/reporting module 370 receives electronic messages and associated content from the administration module 340. In an embodiment, the alert/reporting module 370 flags an electronic message as associated malicious content before transmitting the message by appending identification data to the electronic message. Upon receipt by the destination device 102 or user device 170, the appended data differentiates the electronic message from electronic messages not associated with malicious content. For example, the appended data causes an icon or warning message to be displayed by the destination device 102 or user device 170.

Alternatively, the alert/reporting module 370 communicates a separate warning message to the message transmitter 360, the warning message is then transmitted to the destination device 102 or user device 170 and notifies the recipient that a message associated with harmful content has been identified. The message transmitter 360 then communicates the electronic message and associated content to the message transmitter 360 for transmission to its intended destination. In one embodiment, the alert/reporting module 370 also generates and transmits, via the message transmitter 360, a report to the user including data describing received malicious content, such as the number of received messages including malicious content, the types of malicious content received, malicious content senders or other information describing characteristics of messages with malicious content.

A virtual machine 380 comprises one or more software processes executed by one or more processors or other firmware devices. A virtual machine 380 creates a virtual environment for the simulation system 140A, or other computing device, and the operating system of the simulation system 140A, or other computing device. In an embodiment, a virtual machine 380 replicates a computing system associated with a destination computing system using configuration data provided by an electronic message recipient or retrieved from a destination device 102 or user device 170. For example, a virtual machine simulates the operating system, file system, hard disk, configuration data and applications used by a destination device 102 or user device 170. Alternatively, the virtual machine 380 replicates a predetermined destination device 102 or user device 170 using stored configuration data, allowing multiple virtual machines to simulate various types of destination computing systems.

As shown in FIG. 3, the simulation system 140A includes a plurality of virtual machines 380A-N. The virtual machines 380A-N execute content associated with received electronic messages and monitor the execution for actions that harm the virtual machine 380 operating environment, actions that attempt to retrieve configuration data from the virtual machine 380, actions that attempt to replicate content associated with the electronic message or other indications of malicious content. This allows content associated with an electronic message to be executed in a contained and isolated environment, preventing the content associated with the electronic message from harming the destination device 102 or user device 170. Further, by executing the content associated with the electronic message, actions of the content are monitored, allowing identification of malicious actions before the content is executed at the destination device 102 or user device 170. For example, the virtual machines 380A-N monitor the execution for operating system access, replication of at least part of the message content, access to system registry, system files or network protocols or other actions using system resources to determine whether or not content is malicious. Examples of virtual machines 380 for observing message execution are variously described in U.S. patent application Ser. No. 10/299,452, U.S. patent application Ser. No. 10/933,967 and U.S. patent application Ser. No. 12/113,010, all of which are herein incorporated by reference in their entirety.

As a result of observing content execution, a virtual machine 380 classifies content associated with an electronic message as malicious or non-malicious. Classifying content based on execution of the content rather than comparison with predefined patterns or signatures allows for rapid identification of new types of malicious content by relying on execution of the content rather than waiting for the malicious to be identified and added to a pattern or signature database, increasing security. Further, as malicious content associated with an electronic message may take various forms, monitoring execution of content allows for identification of more types of malicious content. For example, malicious content includes any behavior which contributes towards the unnecessary and disproportionate use of a computer processor, memory, or network connection resources. Additional actions associated with malicious content include accessing system resources without authorization, replicating itself or a derivative of itself, automatically causing the e-mail and/or the associated code (or a derivative thereof) to be sent to other computing systems, executing disk reads or writes without authorization, accessing the system registry, any address list, and/or altering any part of the physical or logical system.

In one embodiment, a virtual machine 380 combines the different components of an electronic message and its associated content identified by the filtering module 320 to replicate how the content associated with the electronic message would be executed on a destination device 102 or user device 170. For example, the virtual machine 380 evaluates a URL in an emulated e-mail client so that the URL content is interpreted the same way it would be interpreted by the destination device 102 or user device 170. Alternatively, a virtual machine 380 separately evaluates the different components of the electronic message and associated content. For example, the virtual machine 380 executes the attachments and/or embedded code identified by the filtering module 320. As the virtual machine 380 executes the attachments and/or embedded code, actions associated with malicious content are identified and used to classify the attachment and/or executable code. For example, the virtual machine 380 monitors file system requests made by executed content. Examples of file system requests associated with malicious content include requests to access an address book maintained by the file system for potential virus spread. In another embodiment, the virtual machine 380 detects an attempt to modify or overwrite a pre-existing file, or write a new file to or read a sensitive file from the file system. In another example, the virtual machine 380 detects an attempt to modify sector zero of the hard disk. As sector zero is typically used by an operating system and a disk driver of a computing system, accesses to sector zero are not commonly performed by benign content. As external modification of sector zero without authorization renders disk contents inaccessible, if the filtering module 420 identifies an attempted modification of sector zero, the content initiating the sector zero modification is classified as malicious. Additionally, so the virtual machine 380 more accurately simulates a user computing environment, the virtual machine 380 has limited network access. The network access module 330 described above is used to monitor and regulate network access by the virtual machines 380A-N.

Responsive to the results of monitoring the content associated with an electronic message, the virtual machine 380 generates a classification result associated with the electronic message. For example, received electronic messages are classified as non-malicious message or malicious messages. In an embodiment, for each type of electronic message, the virtual machine 380 generates corresponding control signals specifying subsequently processing of the electronic message which are transmitted to the administration module 340 or the filtering module 320. For example, for a malicious message, the control signals are "quarantine" or "delete," causing the administration module 340 to locally store the electronic message or delete the electronic message prior to transmission, respectively. For a non-malicious message, the control signal is "deliver," causing the administration module 340 to transmit the electronic message to the message transmitter 370 for transmission. In another embodiment, the virtual machine 380 updates the filtering module 320 based on the detection result, modifying the types of content or actions that the filtering module 320 associates with malicious content. For example, the filtering module 320 modifies matching patterns or filtering rules used to identify newly classified malicious content.

Figure 4:
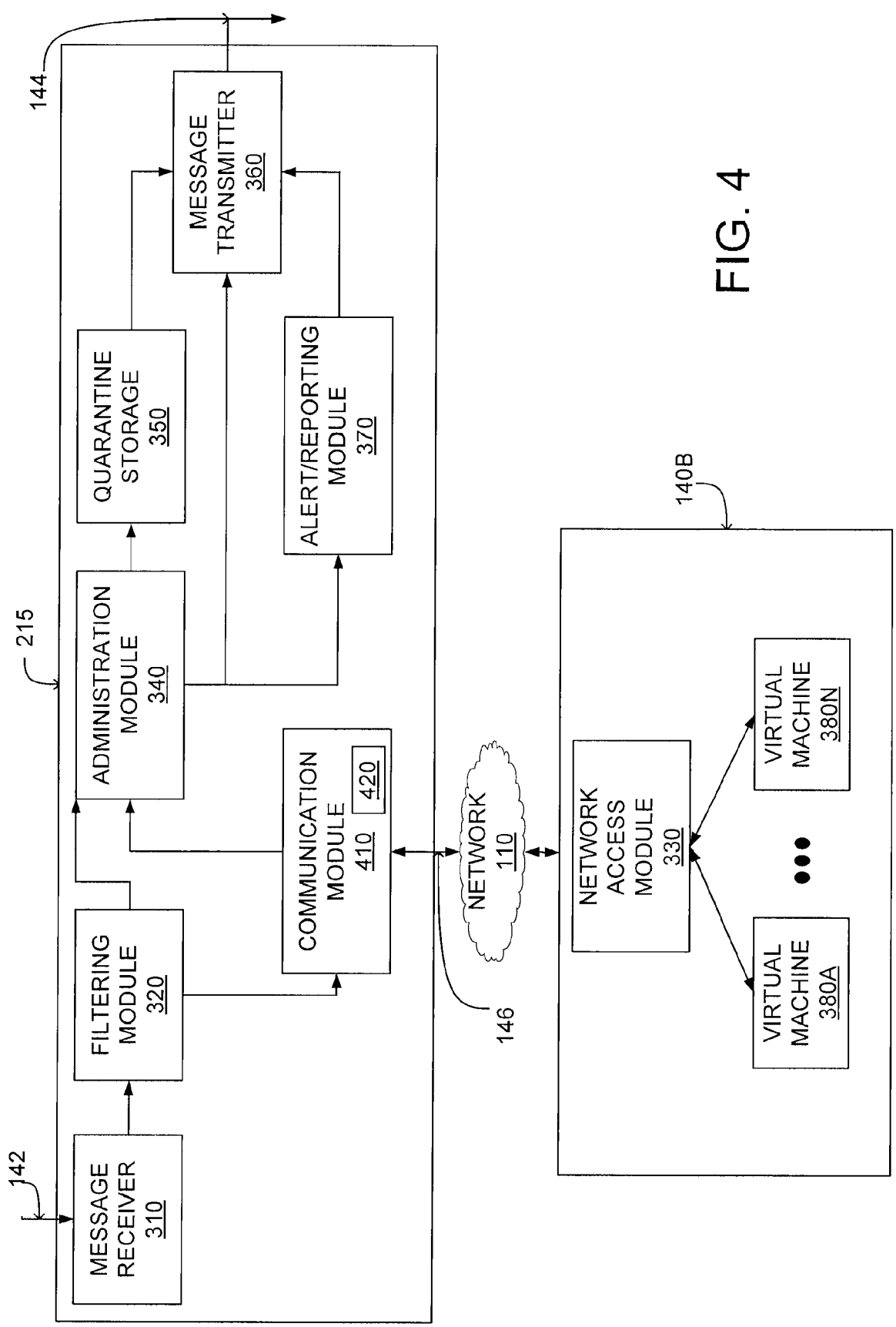
FIG. 4 is a block diagram of an agent module and simulation system for using distributed computing to detect malicious content associated with an electronic message according to an embodiment of the invention.

FIG. 4 is a block diagram of an agent 215 and simulation system 140B for using distributed computing to detect malicious content associated with an electronic message according to an embodiment of the invention. The agent 215 receives electronic messages and associated content and communicates the electronic messages and associated content to a remote simulation system 140B which determines whether content associated with electronic messages is malicious.

The agent 215 includes similar components as the simulation system 140A described above in conjunction with FIG. 3. The agent 215 includes a message receiver 310, a filtering module 320, an administration module 340, a quarantine storage 350, a message transmitter 360 and an alert/reporting module 370 which have been described above in conjunction with FIG. 3. The agent 215 also includes a communication module 410 which receives an electronic message and associated content from the filtering module 320 and communicates the electronic message and associated content to the remote simulation system 140B via network 110. The communication module 410 also receives classification results and/or control signals from the simulation system 140B.

The communication module 410 allows the agent 215 to communicate with the simulation system 140B and/or other devices. In a preferred embodiment, the communication module 410 is coupled to a wired network to minimize data transmission time between the agent 215 and the simulation system 140B. In an alternative embodiment, the communication module 410 comprises a transceiver such as for infrared communication, Bluetooth communication, 3G communication, radio frequency communication, or any other wireless communication technique. In yet another alternate embodiment, the communication module 410 is coupled to a wired connection, such as Ethernet, Universal Serial Bus (USB), or other wired communication techniques. Alternatively, the communication module 410 comprises a bus, such as an industry standard architecture (ISA) bus, a peripheral component interconnect (PCI) bus, a universal serial bus (USB), an inter-integrated circuit (I2C) bus, a serial peripheral interface (SPI) bus, a proprietary bus configuration or another suitable bus providing similar functionality, for communication with the simulation system 140B. Alternatively, the communication module 410 comprises both a wired connection and a transceiver. The communication module 410 allows data, commands and/or information to be distributed using network protocols, such as Transmission Control Protocol (TCP), Internet Protocol (IP), Hypertext Transmission Protocol (HTTP), or other protocols capable of communicating data or information. Alternatively, the communication module 410 comprises any communication method capable of transmitting to and receiving from a simulation system 140B. In one embodiment, the communication module 410 includes a message queue 420, which comprises a volatile or non-volatile storage device that stores electronic messages until the a classification result or control signal is received from the simulation system 140B.

The simulation system 140B includes a network access module 330, further described below in conjunction with FIGS. 5 and 6, and one or more virtual machines 380A-N as described above in conjunction with FIG. 3. The network access module 330 receives electronic messages and associated content from the communication module 410 via network 110 and communicates the received electronic message and associated content to a virtual machine 380. The network access module 330 then receives classification results and/or control signals from a virtual machine 380 to the communication module 410 via the network 110. Hence, the simulation system 140B allows for execution of content associated with an electronic message at a remote location, further preventing the enterprise system 180B from being affected by malicious content associated with an electronic message. Separating the simulation system 140B and agent 215 also allows each component to be separately maintained and modified.

Figure 5:
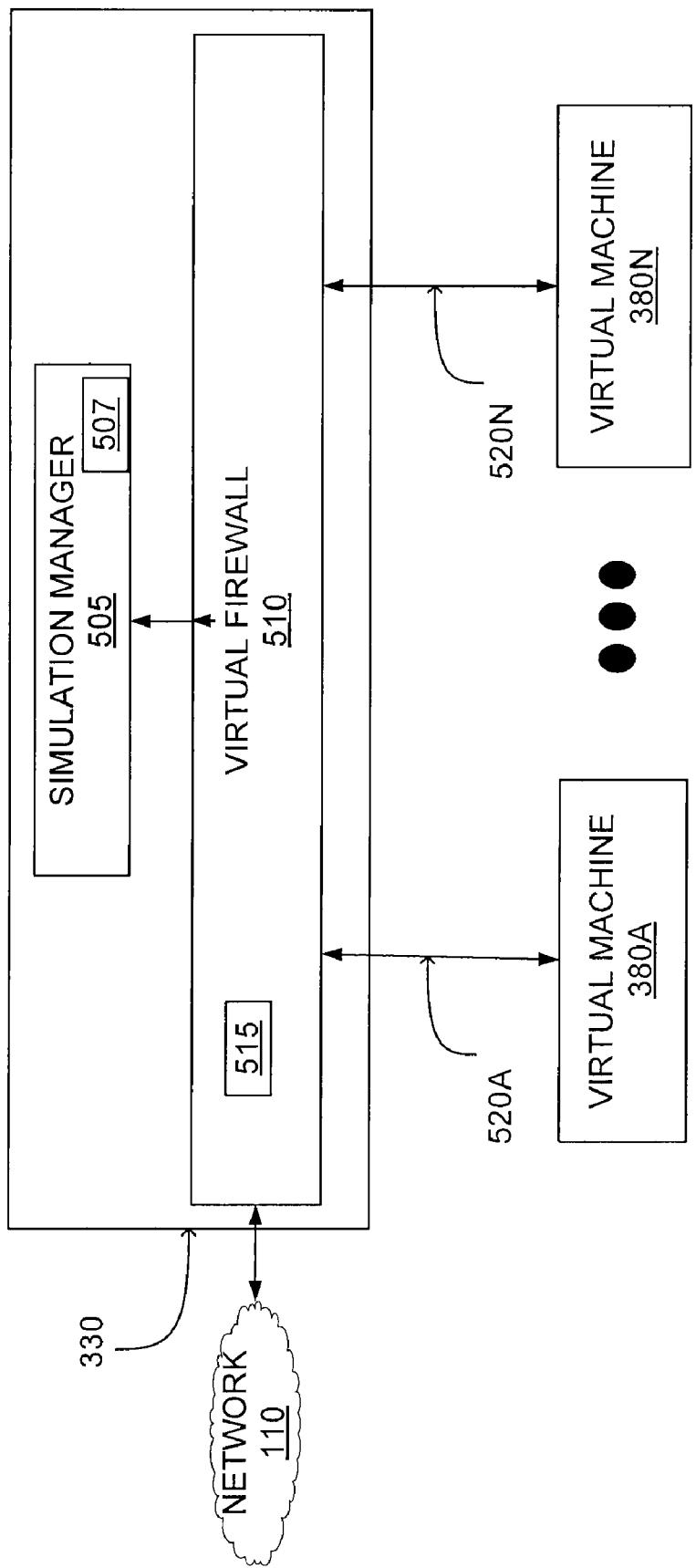
FIG. 5 is block diagram of a network access module for communicating with one or more virtual machines according to an embodiment of the present invention.

FIG. 5 is block diagram of a network access module 330 for communicating with one or more virtual machines 380A-N according to an embodiment of the present invention. The network access module 330 comprises a simulation manager 505 and a virtual firewall 510. In one embodiment, the simulation manager 505 and the virtual firewall 510 comprise multiple software processes for execution by a processor (not shown) and/or firmware applications. The software and/or firmware processes and/or applications can be configured to operate on a general purpose microprocessor or controller, a field programmable gate array (FPGA), an application specific integrated circuit (ASIC) or a combination thereof. In another embodiment, the modules comprise portions or subroutines of a software or firmware application that processes messages. Moreover, other embodiments can include different and/or additional features and/or components than the ones described here.

The simulation manager 505 receives electronic messages and associated content from the communication module 410 or the filtering module 320 and transmits classification results and/or control signals to the communication module 410, filtering module 320 or administration module 340. The simulation manager 505 associates received electronic messages with a virtual machine 380 and communicates the received messages and associated content to the virtual firewall 510 for communication to the associated virtual machine 380. In a preferred embodiment, the simulation manager 505 is coupled to a wired network connection to minimize data transmission time between agent module and simulation system. In an alternate embodiment, the simulation manager 505 comprises a transceiver such as for infrared communication, Bluetooth communication, 3G communication, radio frequency communication, or any other wireless communication technique. In yet another alternative embodiment, the simulation manager 505 comprises is coupled to a wired connection, such as Ethernet, Universal Serial Bus (USB), or other wired communication techniques. In another embodiment, the simulation manager 505 comprises a bus, such as an industry standard architecture (ISA) bus, a peripheral component interconnect (PCI) bus, a universal serial bus (USB), an inter-integrated circuit (I2C) bus, a serial peripheral interface (SPI) bus, a proprietary bus configuration or another suitable bus providing similar functionality, for communication with a local filtering module 320 or administration module 340. Alternatively, the simulation manager 505 comprises a combination of a wired connection and a transceiver.

Additionally, the simulation manager 505 includes a message table 507. The message table 507 comprises a storage device, such as a volatile storage device, non-volatile storage device or combination of a volatile storage device and a non-volatile storage device, which includes data associating a virtual machine 380 with an electronic message. For example, the message table 507 includes a table associating a virtual machine identifier which uniquely identifies a virtual machine 380 with a message identifier that describes or identifies a received electronic message. This allows the simulation manager 505 to identify the virtual machine 380 evaluating an electronic message and to identify the electronic message associated with a classification result or control signal received from a virtual machine 380.

The virtual firewall 510 receives electronic messages from the simulation manager 505 and transmits the electronic messages to virtual machines 380A-N identified by the simulation manager 505. Also, the virtual firewall 510 receives classification results and/or control signals from the virtual machines 380A-N and communicates the classification results and/or control signals to the simulation manager 505. In an embodiment, the virtual firewall 510 is also adapted to communicate with the network 110. The virtual firewall 510 blocks transmission or receipt of certain types of data between virtual machines 380A-N and/or between a virtual machine 380 and the network 110. To prevent unregulated data sharing between different virtual machines 380A-N, the virtual firewall 510 maintains a separate connection 520A-N with each virtual machine. In the example shown in FIG. 5, connection 520A is used to connect the virtual firewall 510 with virtual machine 580A while connection 520N is used to connect the virtual firewall 510 with virtual machine 580N. This allows each virtual machine 520A-N to operate using data provided by the virtual firewall 510 rather than by another virtual machine 380. The separate connections 520A-N also allow the virtual firewall 510 to regulate now different virtual machines 380A-N communicate with the network 110, allowing the virtual firewall 510 to differently allocate access to network 110 between various virtual machines 380A-N. Further, use of separate connections 520A-N allows the virtual firewall to apply a common set of network access rules to multiple virtual machines 380A-N with minimal overhead.

The virtual firewall 510 allows a simulation system 140A, 140B to more accurately simulate a destination device 102 or user device 170 because many types of malicious content examine the operating environment prior to execution to determine whether or not the operating environment is emulated. For example, types of malicious content initially examine the operating environment to identify active network connections and will terminate execution an active network connection is detected. As the virtual firewall 510 permits a limited amount of network traffic between the network 110 and a virtual machine 380, the combination of virtual machine 380 and virtual firewall 510 allows the virtual machine 380 to maintain the appearance of a networked computer system to content being executed by the virtual machine 510. To regulate network traffic from a virtual machine 380, commands from the virtual machine 380 are communicated to the virtual firewall 510 which classifies received command. For example, the virtual firewall 510 applies a set of rules to received commands to determine whether or not to perform a network action requested by the command.

In one embodiment, the virtual firewall 510 is coupled to the network 110 to receive configuration or maintenance commands from the virtual machine 380. For example, network commands such as domain name server (DNS) lookup requests, hypertext transfer protocol (HTTP) requests, packet internet grouper (PING) commands or similar network maintenance commands are allowed to access the network 110. Alternatively, the virtual firewall 510 terminates access to the network 110 when commands are received from the virtual machine 380 requesting transmission of certain types of data For example, access to the network 110 is terminated when commands such as file transfer protocol (FTP) requests, simple mail transfer protocol (SMTP) session requests, server message block (SMB) file transfer requests or other data transfer commands are received. Thus, the virtual firewall 510 allows content executed by the virtual machine 380 to transmit a limited amount of data using the network connection, but terminates access to the network 110 connection before certain data, such as configuration settings or user data, are transmitted. Hence, the virtual firewall 510 allows benign network traffic to occur without restriction, but terminates network traffic upon receiving a potentially malicious network command. This allows the content executed by a virtual machine 380 to maintain a connection to the network 110 but prevents the content executed by the virtual machine 380 from transmitting or receiving additional data via network 110.

In one embodiment, the virtual firewall 510 includes an access rule store 515. The access rule store 515 comprises a storage device, such as a non-volatile storage device, a volatile storage device or a combination of a non-volatile storage device and a volatile storage device that includes one or more network access rules. For example, a set of "always allow" rules identifies commands from a virtual machine 380 that are permitted to access the network 110, such as login commands, status check commands or other connection establishment or maintenance commands. A set of "potentially malicious" rules identifies commands whose access to network 110 is limited and closely monitored, such as file mapping requests or similar commands. The "potentially malicious" rules are monitored by the virtual firewall 510 to identify the data sought to be transmitted and the virtual firewall 510 terminates network 110 access if the content executed by the virtual machine 380 attempts to transmit certain types of data (e.g., configuration data, system parameters, etc.). Another set of "malicious" rules identifies commands with no network access, such as commands to transmit system- or user-specific data. The virtual firewall 510 terminates access to network 110 upon receiving a command associated with a "malicious rule." In one embodiment, the network access rules stored in the access rules store 515 are dynamically modified by user input or by software process during system operation, allowing network access by different commands to be modified responsive to detected actions. Alternatively, a predefined set of network access rules are applied to network traffic.

Figure 6:
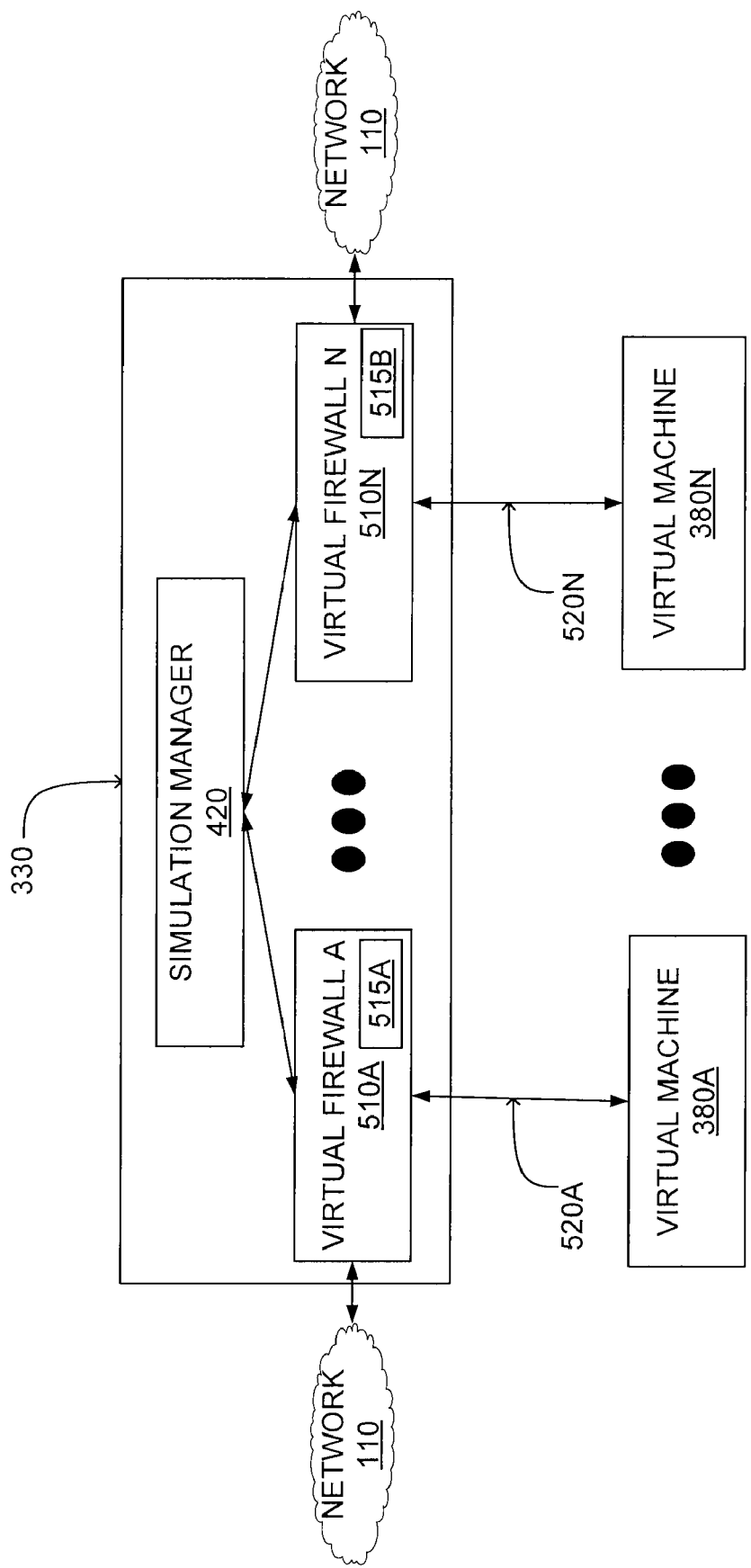
FIG. 6 is a block diagram of an alternative network access module for communicating with one or more virtual machines according to another embodiment of the present invention.

FIG. 6 is a block diagram of an alternative network access module 330 for communicating with one or more virtual machines 380 according to another embodiment of the present invention. In the embodiment shown in FIG. 6, the network access module 330 associates a separate virtual firewall 510A-N with each virtual machine 380A-N. As shown in FIG. 6, respective groupings (e.g., 510A, 520A, 380A and 510N, 520N, 380N) of multiple groupings of virtual firewalls 510A-N, connections 520A-N and virtual machines 380A-N are used to simulate execution of content associated with electronic messages.

Hence, in FIG. 6, virtual machine 380A communicates with virtual firewall 510A using connection 520A while virtual machine 380N communicates with virtual firewall 510N using connection 520N. The different virtual machines 380A-N are also each adapted to communicate with the network 110, allowing different virtual machines 380A-N to have limited network access to better simulate a destination device 102 or user device 170 having network access.

In an embodiment, the virtual firewalls 510A-N include different access rule stores 515A-N. This use of different access rule stores 515A-N with different virtual machines 380A-N allow implementation of different network access and/or filtering rules for each virtual machine 380A-N, so that different virtual firewalls 510A-N are able to implement different sets of network access rules. Additionally, use of multiple virtual firewalls 510A-N allows the network access module 330 to more particularly allocate network resources among different virtual machines 380A-N wile keeping virtual machines 380A-N independent of each other.

System Operation

Figure 7:
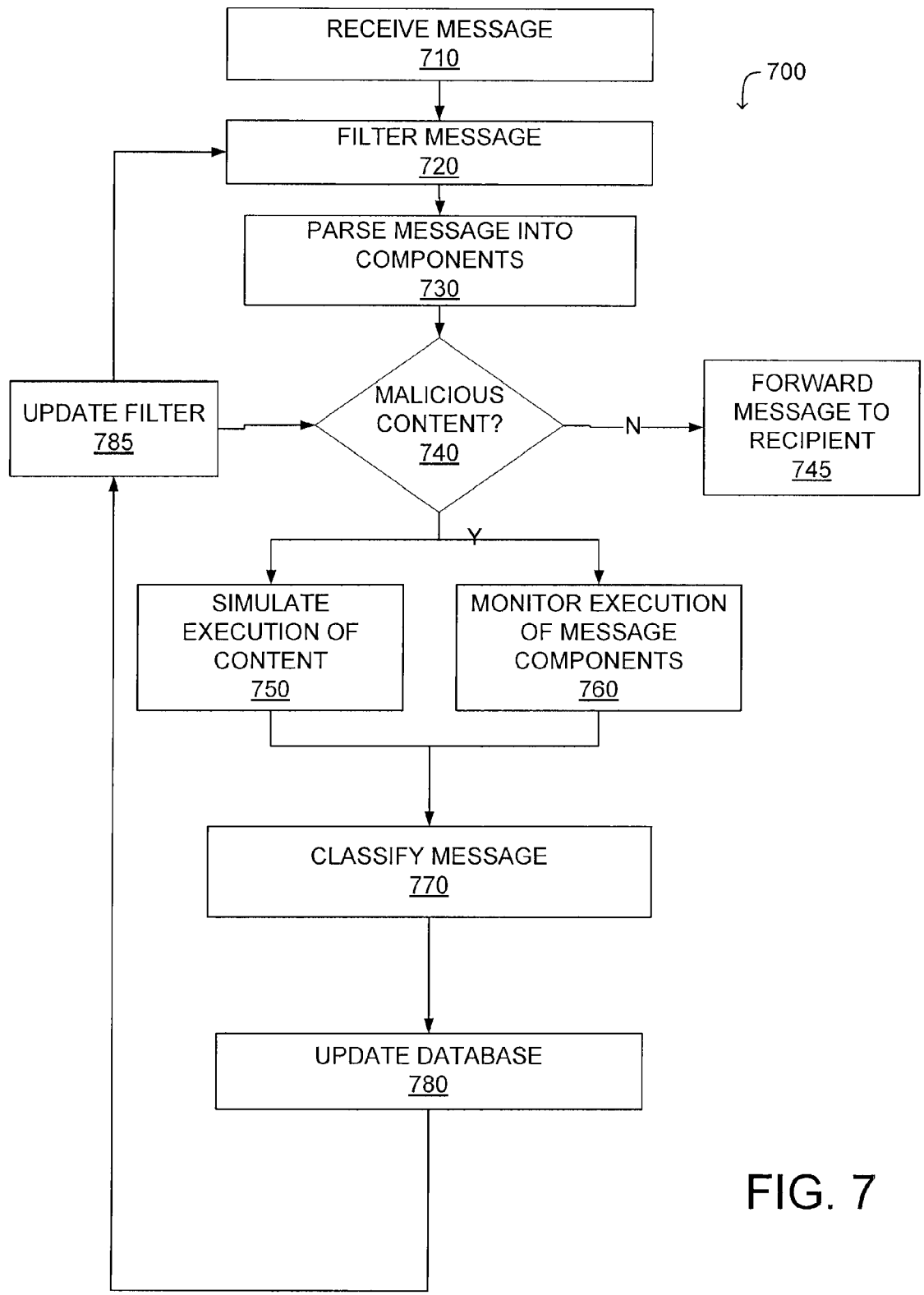
FIG. 7 is a flow chart of a method for detecting malicious content associated with an electronic message according to an embodiment of the present invention.

FIG. 7 is a flow chart of a method 700 for detecting malicious content associated with an electronic message according to an embodiment of the present invention. Those of skill in the art will recognize that other embodiments can perform the steps of FIG. 7 in different orders or include different and/or additional steps than the ones described herein.

Initially, a simulation system 140A or an agent 215 receives 710 an electronic message. In various embodiments, the message comprises an e-mail, a text message, a short message service message, a chat request, an Instant Message™ request, a torrent file or other suitable type of electronic communication. Content, such as executable code, attachments, Universal Resource Indicators (URI), telephone numbers, screen names, e-mail addresses or other electronic information is associated with the electronic message. The received electronic message is then filtered 720 by the filtering module 320 using pattern or signature matching techniques to determine whether the electronic message or associated content includes one or more known or conventional viruses.

The filtering module 320 then parses 730 the electronic message and associated content into components. For example, the electronic message and associated content is parsed into URLs, attachments and/or active content within the message body. Parsing 730 the electronic message and associated content into components allows the different components to be examined for association with malicious content. In one embodiment, the parsed components are compared to a stored database to determine 740 whether or not content associated with the electronic message content was previously identified as malicious. If the electronic message and associated content do not include content known to be malicious and does not include unknown content, the electronic message and associated content is forwarded 745 to the destination device 102 or user device 170. For example, if the received electronic includes plain text with no executable code or attachment, the electronic message is forwarded 745 to the destination device 102 or user device 170.

However, if the electronic message or associated content includes content that may be malicious or an unknown content, execution of the electronic message and associated content is simulated 750 by a virtual machine 380. In one embodiment, the simulation system 140A simulates 750 execution of the electronic message and associated content using a local virtual machine 380. Alternatively, the electronic message and associated content is transmitted from the agent 215 to a remote simulation system 140B where a virtual machine 380 simulates 750 execution of the electronic message and associated simulation system. If the electronic message and associated content is transmitted to a remote simulation system 140B, an agent identifier is attached to the electronic message, allowing the remote simulation system 140B to identify the agent 215 that transmitted the electronic message and associated content and to transmit a classification result and/or control signal back to the agent 215.

The virtual machine 380 then monitors 760 execution of the electronic message and associated content. In one embodiment, the virtual machine separately simulates 750 execution of different components of the electronic message and associated content. Alternatively, the virtual machines 380 combine the parsed components to simulate 750 execution of the electronic message and associated content as a whole. Alternatively, separate virtual machines 380A-N are used to evaluate execution of different types of content associated with an electronic message. For example, virtual machine 380A executes or navigates a URI included in the electronic message while virtual machine 380N evaluates an executable file embedded in, attached to or otherwise associated with the electronic message. In another embodiment, separate virtual machines 380A-N simulate 750 execution of different components of electronic messages and associated content while a different virtual machine 380 combines the components to simulate 750 execution of the electronic message and associated content as a whole. This allows evaluation of each component as well as evaluation of different interactions between components to determine whether a combination of components causes a malicious action. Additionally the virtual firewall 510 provides limited network access to the content associated with the electronic message while execution is simulated 750 by the virtual machines 380. For example, the virtual firewall 510 allows transmission and receipt of certain types of data, such as network connection configuration data, using a connection to network 110 while preventing transmission of other types of data, such as user data or system configuration data, using the connection to network 110.

Execution of the electronic message and associated content, or components of the electronic message and associated content, is monitored 760 for indications of malicious content such as system file or registry access, message replication or other actions affecting system resources. For example, if content associated with the electronic message attempts to access configuration data of the virtual machine 380, modify the file system of the virtual machine 380, transmit configuration data of the virtual machine 380, reallocate resources of the virtual machine 380 or perform a similar action, these actions are detected via monitoring 760. The electronic message and associated content and/or the individual message components are then classified 770 by the virtual machine 380 as malicious or non-malicious based on data obtained during monitoring 760. In an embodiment, the results of the classification are used to update 780 a database that identifies electronic messages or associated content or electronic message components as malicious or non-malicious. Updating 780 the database allows subsequently received electronic messages and associated content to be compared to the database, allowing identification of malicious content requiring the electronic message and associated content to be simulated 750. In one embodiment, the updated database is then used to update 795 the filtering module 320, allowing for dynamic modification of the filtering module 320 to detect newly identified malicious content.

The classification result is then communicated to the administration module 340. In an embodiment, the virtual machines 380 communicates the classification result to the network access module 330 which then transmits the classification result to the administration module 340. Alternatively, the network access module 330 communicates the classification result to a communication module 410 which transmits the classification result to the administration module 340. If the classification result indicates that the electronic message or associated content is malicious, the administration module 340 takes a preventative measure, such as quarantining the electronic message and associated content in a quarantine storage 350, deleting the electronic message and associated content, flagging the electronic message and associated content using the alert/reporting module 370 or performing another action to prevent the destination device 102 or user device 170 from executing the electronic message or associated content.

Alternatively, if the classification result indicates that the electronic message and associated content non-malicious, the administration module 340 transmits the electronic message and associated content to the message transmitter 360 which forwards 745 the electronic message and associated content to the destination device 102 or user device 170. In an embodiment, the classification message also includes a signature or profile which is communicated to the filtering module 320, allowing the filtering module to locally detect subsequent messages having a previously detected type of malicious content. Alternatively, a separate filter configuration message is transmitted from the network access module 330 to the filtering module 320 including the profile or signature identifying content classified as malicious.

Figure 8:
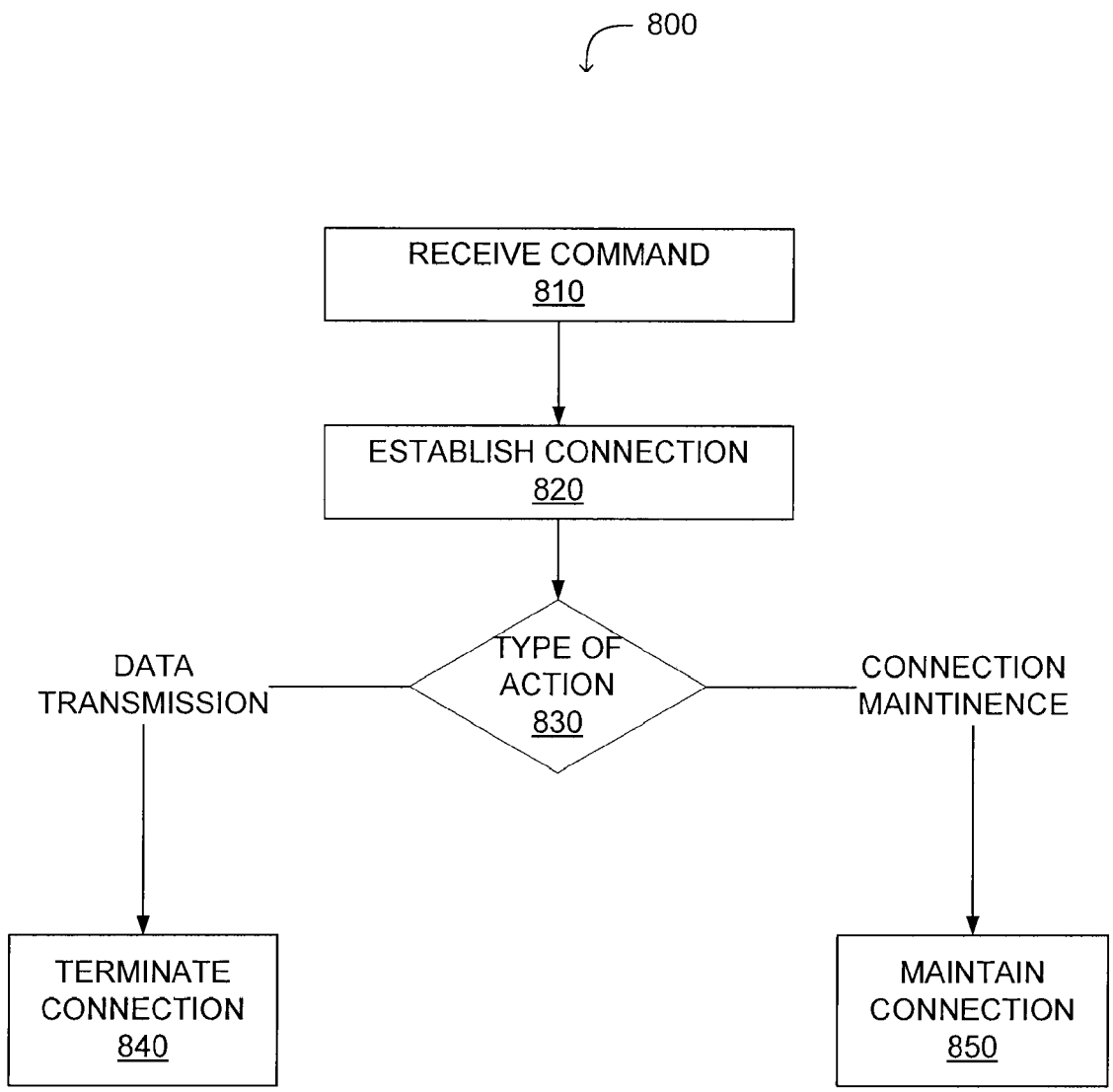
FIG. 8 is a flow chart of a simplified method for preventing propagation of malicious content associated with an electronic message according to an embodiment of the present invention.

FIG. 8 illustrates a flow chart of a simplified method 800 for the network access module 330 to prevent propagation of malicious content according to one embodiment of the present invention. In one embodiment, the method shown in FIG. 8 is executed by a virtual firewall 510 as network access commands are received from a virtual machine 380. Those of skill in the art will recognize that other embodiments can perform the steps of FIG. 8 in different orders or include different and/or additional steps than the ones described herein.

Initially, the virtual firewall 510 receives a command, or request, for network access from a virtual machine 380 which is simulating execution of an electronic message or content associated with an electronic message. Responsive to the received command, the virtual firewall establishes 820 a connection to a network 110. The established connection allows the virtual machine 380 to access the network 110 responsive to execution of the electronic message or associated content using the virtual firewall 510. The virtual firewall 510 monitors the data communicated from the virtual machine 380 to the network 110 to allow the virtual machine 380 limited accesses to the network 110. This causes the content executed by the virtual machine 380 to execute as if it were operating in a device 102 or user device 170 having network access, allowing the virtual machine 380 to more accurately simulate the device 102 or user device 170.

However, the virtual firewall 510 regulates the access of the virtual machine 380 to the network 110 to prevent propagation of malicious content to the network 110 and to prevent introduction of additional malicious content to the virtual machine 380 from the network. The virtual firewall determines 830 the type of action received from the virtual machine 380, and modifies the connection to the network 110 based on the type of action. In one embodiment, the virtual firewall determines 830 whether the received command attempts to transmit data via network 110 or attempts to maintain the connection to the network 110.

Responsive to determining 830 that the received command is attempting to transmit data, the virtual firewall 510 terminates 840 the connection to network 840. This prevents the content executed by the virtual machine from transmitting data to the network 110, preventing data from spreading from the virtual machine 380 to other devices communicating with the network 110. However, responsive to determining 830 that the received command is attempting to maintain the connection to network 110, (e.g., the received command is a configuration command or a status request), the virtual firewall 510 maintains 850 the connection to the network 110, allowing the virtual machine 380 to continue to simulate access to the network 110. Hence, the virtual firewall 510 allows the virtual machine 380 to more accurately simulate execution of content by appearing to have a connection to the network 110 while preventing the content executed by the virtual machine 380 from communicating harmful data to other devices using the network 110.

Figure 9:
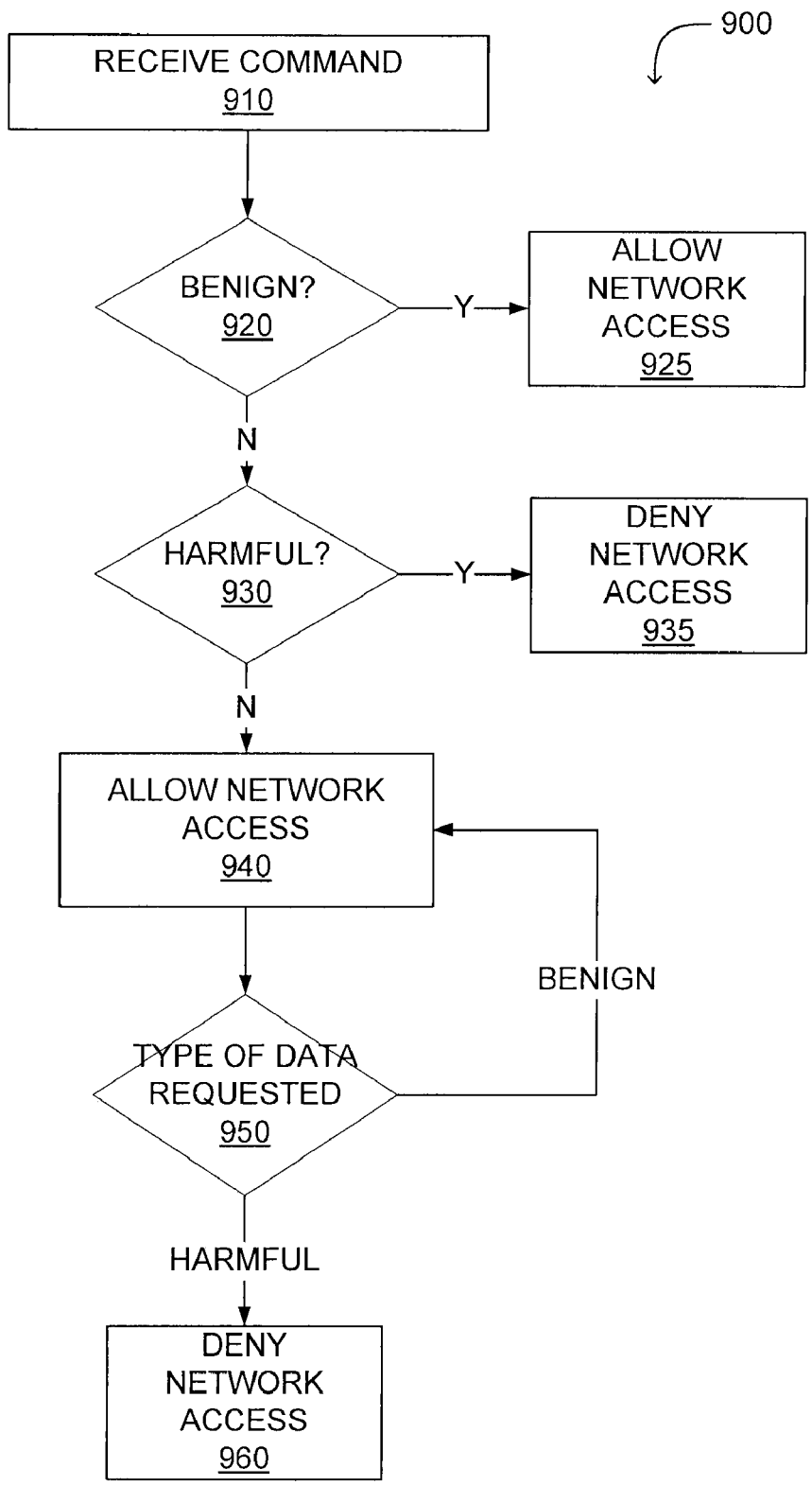
FIG. 9 is a flow chart of a method for preventing propagation of malicious software associated with an electronic message according to an embodiment of the present invention.

FIG. 9 illustrates a flow chart of a method 900 for the network access module 330 to preventing propagation of malicious content according to one embodiment of the present invention. Those of skill in the art will recognize that other embodiments can perform the steps of FIG. 9 in different orders or include different and/or additional steps than the ones described herein.

Initially, the virtual firewall 510 receives 910 a command or request for network access from a virtual machine 380. The virtual firewall 510 then determines 920 if the received command is benign. For example, if the command is a network configuration or maintenance command it is determined 920 to be benign. Hence, network commands such as domain name server (DNS) lookup requests, hypertext transfer protocol (HTTP) requests, packet internet grouper (PING) commands or similar network maintenance commands are determined 920 to be benign, and are allowed 925 to access the network 110. This allows the virtual machine 380 to simulate the presence of a network connection, increasing the accuracy of the simulation.

If the received command is not determined 920 to be benign, it is determined 930 whether the received command is known to be harmful. In one embodiment, the received command is compared to a database containing commands known or predetermined to be malicious. If the received command is determined 930 to be harmful, access to network 110 is denied 935 by the virtual firewall 510. For example, the virtual firewall 510 terminates the connection to network 110 upon receiving a command to transmit certain types of data such as system configuration data, user setting data or similar data. For example, network access is denied 935 when commands such as file transfer protocol (FTP) requests, simple mail transfer protocol (SMTP) session requests, server message block (SMB) file transfer requests, a Distributed File System (DFS) request, a Network Basic Input/Output (NetBIOS) session service request or other data transfer commands are received 910 and identified.

However, if the received command is not determined 920 to be benign and not determined 930 to be a known harmful or malicious command, the virtual firewall 510 allows 940 the command to access the network 110. The virtual firewall 510 then monitors the command to determine 950 the type of data requested by the command. In one embodiment, the port numbers used in a network access session are monitored to determine 950 the type of data requested. Alternatively, the data transmitted via the virtual firewall 510 includes a unique identifier associated with the originating virtual machine 380, and the transmitted data is monitored for the presence of the unique identifier data. If the command requests transmission or receipt of benign data, such as data to perform a status check or to maintain a network connection, the virtual firewall 510 allows 940 the requested network access while continuing to monitor subsequently requested data. However, if the command requests transmission or receipt of harmful, or potentially harmful, data (e.g., system configuration files, user information, registry data, etc.), the virtual firewall 510 denies 960 network access, such as by terminating the connection to the network 110. This allows for more accurate detection of malicious content associated with an electronic message by allowing the virtual machine 380 to access the network 110 in certain situations. However, security is maintained as the virtual firewall 510 terminates access to the external network if content executed by the virtual machine 380 attempts to transmit or receive certain types of data.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. An apparatus for preventing propagation of malicious content specifying a destination computing device during simulation of execution of content, comprising: a plurality of virtual machines for executing the content in a simulation environment simulating an environment associated with the destination computing device; a simulation manager for receiving the content and associating a destination virtual machine from the plurality of virtual machines with the content; a virtual firewall adapted to communicate with the simulation manager and the plurality of virtual machines, the virtual firewall establishing a connection to a network, communicating the content to the destination virtual machine and applying one or more access rules to identify a network access command that includes a type of a network action received from the destination virtual machine during execution of the content, wherein the one or more access rules modify the connection to the network, the virtual firewall also preventing the network access command from propagating to a second virtual machine, and wherein the one or more access rules comprise responsive to determining the network access command is non-malicious, determining to allow the network access command to access the connection to the network; responsive to determining the network access command is malicious, terminating the connection to the network before the network access command transmits data using the connection to the network; and responsive to failing to determine whether the network access command is malicious or non-malicious, determining to allow the network access command to access the connection to the network, monitoring data including one or more data types transmitted by the network access command via the connection to the network, and responsive to detecting transmission of the one or more data types via the connection to the network, terminating the connection to the network, wherein the one or more data types include one or more of configuration data, user data, and registry data.

2. The apparatus of claim 1, wherein determining the network access command is non-malicious comprises:

determining the network access command comprises a command to maintain the connection to the network.

3. The apparatus of claim 2, wherein the command to maintain the connection to the network comprises a status request, a domain name server (DNS) lookup request, a hypertext transfer protocol (HTTP) request or a packet internet grouper (PING) command.

4. The apparatus of claim 1, wherein determining the network access command is malicious comprises:

determining the network access command is a command to transmit data via the connection to the network.

5. The apparatus of claim 4, wherein the command to transmit data via the connection to the network comprises: a file transfer protocol (FTP) request, a simple mail transfer protocol (SMTP) session request, a server message block (SMB) file transfer request, a Distributed File System (DFS) request or a Network Basic Input/Output (NetBIOS) session service request.

6. The apparatus of claim 1, wherein determining the network access command is malicious comprises:

determining the network access command comprises a command to transmit a subset of data via the connection to the network.

7. The apparatus of claim 6, wherein the subset of data comprises: configuration data, user identification data, registry data or contact data.

8. A computer-implemented method for preventing propagation of malicious content during execution of content, comprising: associating the content with a virtual machine; establishing a network connection; receiving a network access command generated by execution of the content in the virtual machine using an environment similar to an environment of a destination computing device; applying one or more access rules to identify the network access command that includes a type of network action, the one or more access rules specifying whether the network connection is maintained; modifying the network connection responsive to the one or more access rules; and wherein the one or more access rules comprise responsive to determining the network access command is non-malicious, determining to allow the network access command to access the connection to the network; responsive to determining the network access command is malicious, terminating the connection to the network before the network access command transmits data using the connection to the network; and responsive to failing to determine whether the network access command is malicious or non-malicious, determining to allow the network access command to access the connection to the network, monitoring data including one or more data types transmitted by the network access command via the connection to the network, and responsive to detecting transmission of the one or more data types via the connection to the network, terminating the connection to the network, wherein the one or more data types include one or more of configuration data, user data, and registry data.

9. The computer-implemented method of claim 8, wherein determining the network access command is non-malicious comprises:

determining the network access command comprises a command to maintain the network connection.

10. The computer-implemented method of claim 9, wherein the command to maintain the network connection comprises a status request, a domain name server (DNS) lookup request, a hypertext transfer protocol (HTTP) request or a packet internet grouper (PING) command.

11. The computer-implemented method of claim 8, wherein determining the network access command is malicious comprises:

determining the network access command is a command to transmit data via the network connection.

12. The computer-implemented method of claim 11, wherein the command to transmit data via the network connection comprises: a file transfer protocol (FTP) request, a simple mail transfer protocol (SMTP) session request, a server message block (SMB) file transfer request, a Distributed File System (DFS) request or a Network Basic Input/Output (NetBIOS) session service request.

13. The computer-implemented method of claim 8, wherein determining the network access command is malicious comprises:

determining the network access command comprises a command to transmit a subset of data via the network connection.

14. The computer-implemented method of claim 13, wherein the subset of data comprises: configuration data, user identification data, registry data or contact data.

15. The computer-implemented method of claim 8, further comprising:

preventing the network access command from accessing a second virtual machine, the second virtual machine not associated with the content.

* * * * *